May 24, 1938.  J. R. GASTON  2,118,554
INDUCTIVE RECTIFIER
Filed June 24, 1936   3 Sheets-Sheet 1

INVENTOR
John R. Gaston
BY
A. D. T. Libby
ATTORNEY

May 24, 1938.  J. R. GASTON  2,118,554
INDUCTIVE RECTIFIER
Filed June 24, 1936  3 Sheets-Sheet 2

INVENTOR
John R. Gaston
BY
A. D. T. Libby
ATTORNEY

Patented May 24, 1938

2,118,554

UNITED STATES PATENT OFFICE 2,118,554

INDUCTIVE RECTIFIER

John R. Gaston, East Orange, N. J., assignor to American Transformer Company, Newark, N. J.

Application June 24, 1936, Serial No. 86,956

9 Claims. (Cl. 175—363)

This invention relates to a rectifier, and more particularly to a static inductive electric current and voltage power converter, or inductive rectifier, for transforming any alternating current and voltage power supply of any number of phases greater than one, in order to get the necessary phase displacement, and of any suitable frequency, to a direct current and voltage power supply.

The principal object of this invention is to provide a rectifier that operates inductively without moving parts, and that possesses at least two primary windings per phase which receive an alternating current power supply, and at least two secondary windings per phase connected to complementary windings in another phase to deliver a current and voltage with self-commutating characteristics.

Another object is to produce induced electric energy waves in the secondary windings by means of magnetic suitably polarized core sections, at the same time changing their frequency from that of the primary, and to also cause the amplitude of successive cycles of the secondary waves to alternate in the same phase.

A still further object is to combine the secondary energy waves of the various phases to give a succession of secondary waves having an amplitude in one direction greater than that of any other wave over a period long enough, so that when the secondary windings are suitably connected, the envelope of their peaks may be made to commutate its load through any of the following devices, namely:

A. By using the rectifier in combination with a point to plate discharge in a suitable dielectric medium, making a usable high voltage rectifier which the point to plate method at present does not give with ordinary alternating current.

B. By using it in combination with a corona or glow discharge in any suitable dielectric medium, making a usable high voltage rectifier, which the corona or glow discharge method does not give with present known methods with ordinary alternating current.

C. By saturating reactors and interphase balance coils, either individually or in combination.

D. By using it as an aid to chemical, electronic, mercury vapor, mechanical, or other rectifying devices whose range may be extended by means of this device.

Heretofore, it has not been feasible to obtain continuous rectification prior to the combination of this inductive means with the devices listed under "A" and "B" above, where a natural tendency towards partial rectification existed, or to take better advantage of the conditions stated under "C" and "D".

I have discovered that by means of a suitably polarized magnetic circuit, which takes advantage of any magnetic material, the permeability of which does not vary directly with its excitation, and that by means of any number of phases greater than one, a series of suitably formed secondary voltage waves may be developed having a frequency twice that of the primary and a peak value in one direction during a fraction of the primary cycle, which renders the envelope of these peaks, taken in parallel with respect to a common polarity plane, self-commutating. This gives a continuous unidirectional voltage and current or rectified power supply when used in combination under either of the four conditions "A" to "D", in the usual circuits well understood by the electrical art.

The invention will be better understood from the following description, taken in connection with the drawings in which.

Figure 6:
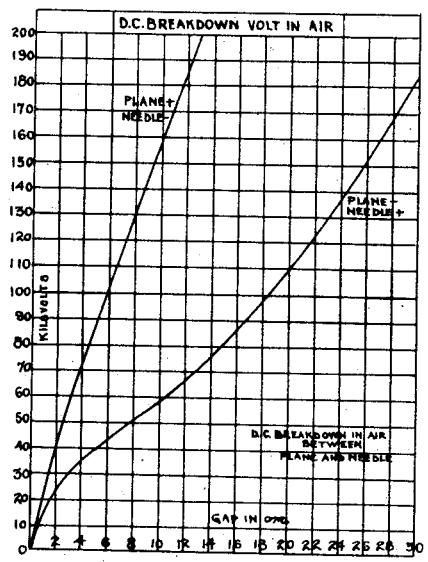

Figure 6 indicates the direct current breakdown values in air between plate and needle for point to plate discharge under standard conditions.

Figure 4:
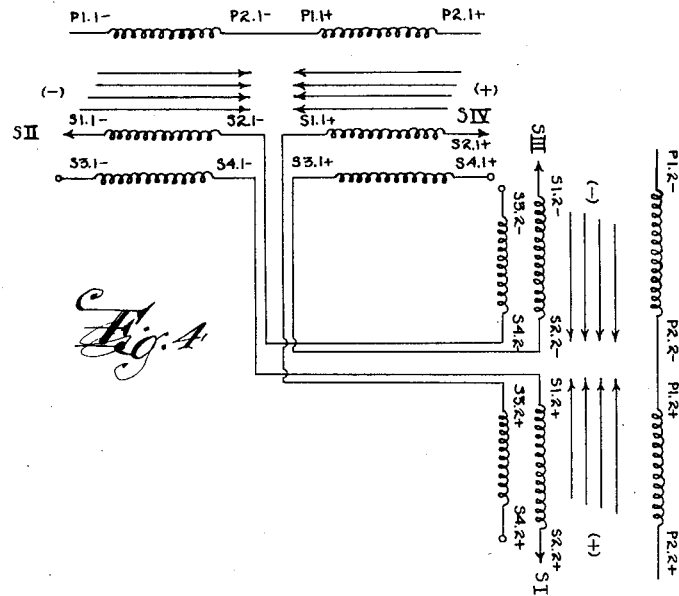
Figure 4 shows a connection diagram with primary phases 90° apart, as in a two or four-phase circuit. The secondaries are shown connected to give peaks spaced 90° apart in terms of the primary frequency, or 180° in terms of the secondary frequency.
Figure 7:
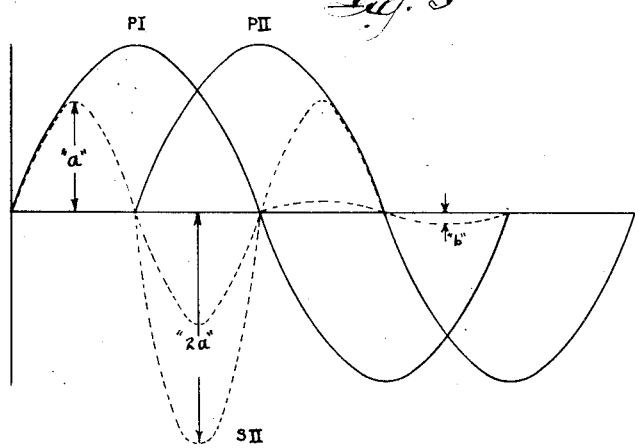
Figure 7:
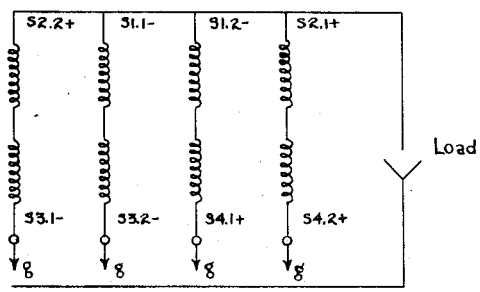

Figure 7 shows the connection diagram of the secondaries across their load in combination with a point to plate discharge for Figure 4.

Figure 8:
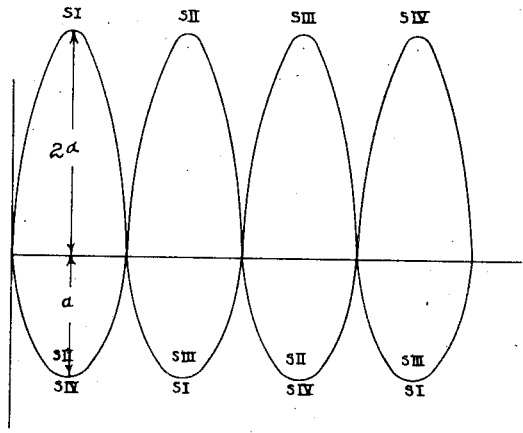

Figure 8 shows the resultant voltages of the secondaries of Figure 4.

Figure 9:
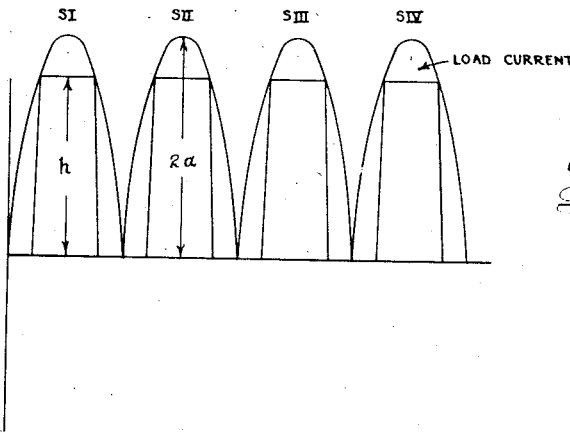

Figure 9 shows the direct current and voltage across the load of Figure 7.

Referring to the drawings, and particularly to the principles on which the invention is based, as illustrated in Figures 1 to 9 thereof, two polarized core members 1 and 2 (Figure 1) are provided for each phase. Each of these cores is always oppositely polarized with respect to its half-cycle in the primary windings 3 and 4 of their respective phase. The secondary sections 5 to 8 inclusive, which may have any turns ratio with respect to the primaries 3 and 4, will then have induced in them, by the primary voltage wave 9 (Figures 2 and 3), a set of secondary voltage waves 10 to 13, having twice the frequency of the primary and an alternating amplitude between cycles of any predetermined difference "a" and "b".

Figure 1:
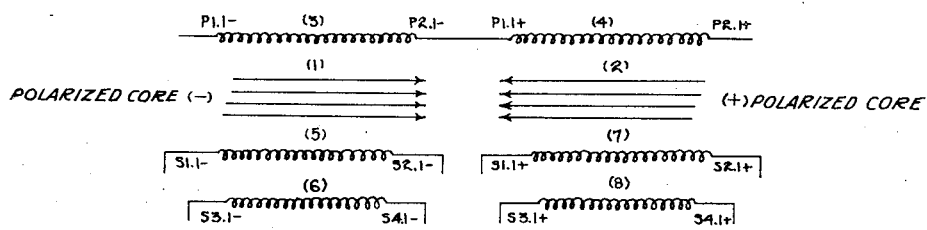
Figure 1 represents one form of a simple assembly of basic elements per phase.
Figure 2:
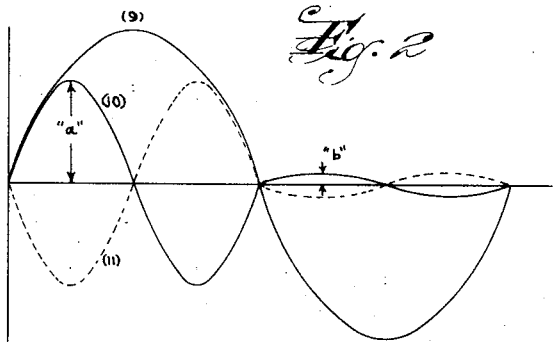
Figure 2 represents the impressed primary voltage of one phase, and the double frequency voltage of the secondary sections on the (—) polarized core of Figure 1, indicating the changing amplitude of alternating cycles, one of the secondary curves being shown in dotted lines to better distinguish it from the other secondary curve.
Figure 3:
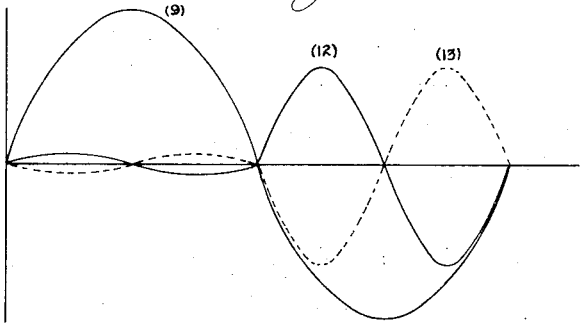
Figure 3 illustrates the impressed primary voltage of the same phase as Figure 2, and the double frequency voltage of the secondary sections on the (+) polarized core of Figure 1, indicating the changing amplitude of alternate cycles in reversed order, the second secondary curve being shown as in Figure 2.

In Figure 2, the voltage waves 10 and 11 are induced in the secondary windings 5 and 6 respectively of Figure 1, while in Figure 3, the voltage waves 12 and 13 are induced in the secondary windings 7 and 8 respectively of Figure 1. With the foregoing description, however, it is not the intent to limit the secondary to the two sections per polarized core sections, or any one phase to two polarized cores, but to permit the use of any other number which may suit the expediency of the design.

To simplify the method of description, the polarities of the winding in each phase of the following polyphase circuits described, will be as in Figures 1 to 3, where the secondary windings 5 and 6 are assumed to be of subtractive polarity with respect to the primary 3 during the first half cycle of the secondary; while the first quarter cycle of the primary is depolarizing the (—) polarized core 1 in each phase. In the same manner, the secondaries 7 and 8 are assumed to be of subtractive polarity with respect to the primary 4 during the fourth half-cycle of the secondary, while the fourth quarter-cycle of the primary is depolarizing the (+) polarized core 2 in each phase. On the basis of the preceding description, it will be understood that the voltage waves 11 and 13 are induced in windings 6 and 8 with the same polarity as 10 and 12 in 5 and 7, but are indicated with this difference in that their leads are reversed with respect to the primary leads.

While Figure 4 illustrates the method of producing an alternating secondary voltage or current wave with alternating amplitude "a" and "b" in successive cycles, the method of their combination as described, to give a self-commutating voltage and current, may further be applied and extended to any polyphase circuit.

In order that the windings may readily be identified, the following system of lettering is used where "P" and "S" stand for primary and secondary respectively; the number thereafter gives the number of the terminal; the number after the period gives the primary phase; and the (±) the polarity of the core. The Roman numerals used after "P" and "S" give their phase sequence.

Figure 5:
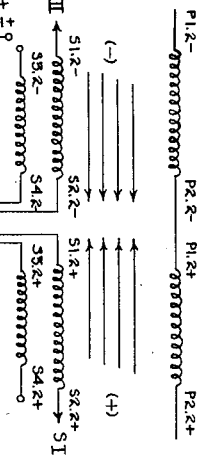
Figure 5 shows the resultant secondary voltage wave of two interconnected secondary sections of Figure 4, showing the double voltage half-wave.

For example, taking the two-phase circuit of Figure 4, and following the connection diagram of the secondary windings S1.1—, S2.1—, S4.2—, S3.2—, we see by Figure 5 that we get a resultant wave whose amplitude is twice in one direction for the second half-cycle as compared to the amplitude of the first and third half-cycles. Assuming "b" in Figures 2 and 3 to be zero, then in Figure 5 the fourth half-cycle would also be zero. The resultant voltage wave SII in Figure 5 is from the preceding description derived from the primary phases PI and PII, and may therefore be considered as voltage wave 10 (Figure 2) added to a similar wave displaced by 90° in the primary, or 180° in the secondary, but with reversed secondary polarity similar to curve 11, but displaced 180° in the secondary. By following the same method in the other secondary circuits, we will get their instantaneous secondary voltage waves as shown in Figure 8.

Applying the envelopes of the parallel secondary voltages of Figure 8 across the point to plate discharge circuit of Figure 7, whose gaps "g" have the characteristics of the curves of Figure 6, rectified voltage and current waves similar to Figure 9 are obtained. This follows from the fact that when any one of the gaps "g" arcs over, the voltage drop across the gap becomes very low, causing the sum of the voltages across certain of the other gaps "g" to have a possible maximum of not over $(a) + (2a)$ (see Figure 8) volts; whereas, from an ordinary alternating current supply as heretofore used, the maximum voltage across said certain gaps, to be the equivalent of $(2a) + (2a)$ or $4a$, giving an insufficient dielectric ratio between "peak" $(2a)$ (see Figure 9) and arcing voltage $h$ to carry its load current without backfiring, which is eliminated in my arrangement.

This development also indicates that the secondary connections may be made to give positive or negative waves, depending on the type of application, A to D inclusive. Furthermore, it indicates that in a similar manner, other polyphase circuits may be employed for a greater number of phases having the same or other secondary phase displacements.

From the above it is to be understood that the converter may be used in multiple to combine any number of alternating currents or voltages of different and distinct polyphase power supply circuits, having the same or different frequencies, into one direct current and voltage power supply circuit.

I claim:

1. A transformer for use in rectifying circuits having plural phase sections including a magnetic core for each phase having oppositely polarized sections, a primary winding associated with each of said sections, and a plurality of interconnected secondary windings located in inductive relation to each of the primary windings.

2. A transformer for use in rectifying circuits having plural phase sections including a magnetic core for each phase having oppositely polarized sections, composed of material the permeability of which does not vary directly with its excitation, a primary winding associated with each of said sections, and a plurality of interconnected secondary windings located in inductive relation to each of the primary windings.

3. A transformer for use in rectifying circuits having plural-phase sections including, at least two oppositely polarized magnetic core sections for each phase, a primary winding associated with each of said sections, and a plurality of interconnected secondary windings located in inductive relation to each of the primary windings.

4. A transformer for use in rectifying circuits having plural-phase sections including, at least two oppositely polarized magnetic core sections for each phase, a primary winding for each section, a pair of secondary windings associated with each primary winding so that there are induced voltage waves therein having at least twice the frequency of the primary, and an alternating amplitude between cycles of any predetermined difference and generally represented by a curve having a distorted form in which one half cycle is peaked and of greater amplitude than the other half cycle, in alternate cycles, the amplitudes of intermediate cycles being suppressed.

5. A transformer for use in rectifying circuits as defined in claim 1, characterized in that the phase sections are arranged at any predetermined electrical angular relation to each other.

6. A transformer for use in rectifying circuits having a plurality of phase sections with at least two primary windings per phase, and at least two secondary windings per phase connected to complementary windings in another phase, each phase section having a core of magnetic material composed of oppositely polarized portions for each of the primary and associated secondary windings.

7. In combination in a rectifier system including a device belonging to one of the classes as described, a transformer for alternating current of more than one phase having an oppositely polarized core for each phase, a plurality of primary windings and a plurality of secondary windings combined with the secondary windings of the different phases so as to give a succession of secondary energy waves having an amplitude in one direction greater than that of any other energy wave over a period long enough, so the envelopes of the peaks of these energy waves taken in parallel will commutate their load when the apparatus is connected to said device.

8. A transformer having self-commutating characteristics for use in rectifying circuits of alternating current of more than one phase including, a core of magnetic material arranged in oppositely polarized sections for each phase, a plurality of primary windings for each phase, a plurality of secondary windings for each phase and in inductive relation to said primary windings, the secondary windings being complementarily interconnected so the energy waves therefrom will be generally of a distorted form in which one half cycle is peaked and of greater amplitude than the other half cycle, in alternate cycles, the amplitudes of intermediate cycles being suppressed.

9. In combination in a rectifying system including a device belonging to one of the classes as described, a polyphase alternating current transformer including series connected primary windings arranged on an oppositely polarized core section for each phase, a plurality of secondary windings on each phase section arranged in inductive relation to the said primary windings, said secondary windings being interconnected so as to give a succession of energy waves having an amplitude such that the envelopes of their peaks will commutate its load when connected to said device as described.

JOHN R. GASTON.